(12) United States Patent
Farajpour et al.

(10) Patent No.: US 10,803,737 B2
(45) Date of Patent: Oct. 13, 2020

(54) WIRELESS MESH NETWORK DISTRIBUTED VISION TRAFFIC MARKER AND METHOD THEREOF

(71) Applicant: Robert Bosch GmbH, Stuttgart (DE)

(72) Inventors: Pouya Farajpour, Menlo Park, CA (US); Pedram Lajevardi, Menlo Park, CA (US); Sam Kavusi, Menlo Park, CA (US); Johan Vanderhaegen, Sunnyvale, CA (US)

(73) Assignee: Robert Bosch GmbH, Stuttgart (DE)

( * ) Notice: Subject to any disclaimer, the term of this patent is extended or adjusted under 35 U.S.C. 154(b) by 218 days.

(21) Appl. No.: 16/063,645

(22) PCT Filed: Dec. 30, 2016

(86) PCT No.: PCT/EP2016/082904
§ 371 (c)(1),
(2) Date: Jun. 18, 2018

(87) PCT Pub. No.: WO2017/114940
PCT Pub. Date: Jul. 6, 2017

(65) Prior Publication Data
US 2018/0374342 A1 Dec. 27, 2018

Related U.S. Application Data

(60) Provisional application No. 62/273,661, filed on Dec. 31, 2015.

(51) Int. Cl.
*G08G 1/04* (2006.01)
*G08G 1/01* (2006.01)
(Continued)

(52) U.S. Cl.
CPC ......... *G08G 1/0116* (2013.01); *G08G 1/0145* (2013.01); *G08G 1/04* (2013.01);
(Continued)

(58) Field of Classification Search
None
See application file for complete search history.

(56) References Cited

U.S. PATENT DOCUMENTS

| | | |
|---|---|---|
| 2010/0254282 A1 | 10/2010 | Chan et al. |
| 2014/0203758 A1 | 7/2014 | Moshfeghi |

FOREIGN PATENT DOCUMENTS

| | | |
|---|---|---|
| EP | 2 151 907 A2 | 2/2010 |
| EP | 2 427 022 A1 | 3/2012 |

(Continued)

OTHER PUBLICATIONS

International Search Report corresponding to PCT Application No. PCT/EP2016/082904, dated Mar. 8, 2017 (3 pages).
(Continued)

*Primary Examiner* — Cai Y Chen
(74) *Attorney, Agent, or Firm* — Maginot, Moore & Beck LLP

(57) ABSTRACT

A vision traffic marker network system includes a management system and a plurality of self-powered wireless traffic nodes configured to collect data from a wireless mesh network. Each wireless traffic node is configured to function as a mesh network traffic node and in each mesh network traffic node, the mesh network traffic node is configured to exchange data between the traffic nodes. Each wireless traffic node in the vision traffic marker system is communicatively coupled to any server and client machine. The management system includes a data acquisition layer, a processing layer, a communication layer, and a management layer. The acquisition layer is configured to receive data from the plurality of wireless traffic nodes and transmit the acquired data to the processing layer so that the acquired data is processed and filtered before the data is broadcasted and distributed the plurality of wireless traffic nodes which in turn exchange or share the data with any server and client
(Continued)

machine. The management layer is configured to perform at least one of the function including: managing and controlling other layers, assigning each node with a role to perform a specific function, and reporting the information to a stakeholder for maintenance.

12 Claims, 14 Drawing Sheets

(51) Int. Cl.
  *H04W 84/18* (2009.01)
  *H04W 4/38* (2018.01)
  *H04W 88/16* (2009.01)
(52) U.S. Cl.
  CPC ............. *H04W 4/38* (2018.02); *H04W 84/18* (2013.01); *H04W 88/16* (2013.01)

(56) References Cited

FOREIGN PATENT DOCUMENTS

| | | | |
|---|---|---|---|
| EP | 2427022 A1 * | 3/2012 | ............ H04W 84/18 |
| JP | 2006-005746 A | 1/2006 | |
| JP | 2010-045526 A | 2/2010 | |
| JP | 2015-170914 A | 9/2015 | |
| WO | 2015/150853 A1 | 10/2015 | |
| WO | WO-2015150853 A1 * | 10/2015 | ........ H04W 74/0808 |

OTHER PUBLICATIONS

English Translation of Japanese Office Action corresponding to Japanese Patent Application No. 2018-534571 dated Mar. 16, 2020 (6 pages).

Tsuno, T. et al., "Sensor Actuator Network Configuration for a Housing Environment," Proceedings of the 2006 IEICE General Conference, 2006 (2 pages).

* cited by examiner

WIRELESS MESH NETWORK DISTRIBUTED VISION TRAFFIC MARKER AND METHOD THEREOF

CROSS-REFERENCE TO RELATED APPLICATION

This application is a 35 U.S.C. § 371 National Stage Application of PCT/EP2016/082904, filed Dec. 30, 2016, which claims priority to a U.S. provisional patent application Ser. No. 62/273,661, filed Dec. 31, 2015, the contents of both applications are incorporated herein by reference as if fully enclosed herein.

FIELD

This disclosure relates generally to traffic markers and, more particularly, to a wireless mesh network distributed vision traffic marker.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Embodiments of the disclosure related to a management device for an intelligent distributed vision traffic marker system comprises a data acquisition layer being configured to receive data from a plurality of wireless traffic nodes operated in a wireless mesh network, a processing layer for filtering the acquired data, and a management layer configured to assign each wireless traffic node with at least one function role, wherein the function role is a gateway node, a data relay node, a data collection node, and a power reserve role. The management device further includes a communication layer configured to transfer software and data between the wireless traffic nodes. A client machine communicatively coupled to at least one of the plurality of the wireless traffic nodes or management device. In one embodiment, the management device is integrated into a vision traffic node. The management layer configured to control one of the data acquisition layer, the processing layer, or the communication layer, in some embodiments. In another embodiment, the management layer configured to report information associated with the acquired data transmitted by one of the plurality of the wireless traffic nodes, wherein the reported information is a low power information. In yet another embodiment, the management layer configured to issue a request associated with the low power information to one of the plurality of the wireless traffic nodes to energize the wireless traffic node with low power.

According to another exemplary embodiment of the disclosure, a device comprises a non-transitory computer-readable medium for carrying or having computer-executable instructions to filter acquired data from a plurality of wireless traffic nodes, the instructions causing a machine to assign each wireless traffic node with at least one function role, wherein the function role is a gateway node, a data relay node, a data collection node, and a power reserve role. In one embodiment, the instructions causing a machine to transfer software and data between the wireless traffic nodes. In another embodiment, the instructions causing a machine to report information associated with the acquired data transmitted by one of the plurality of the wireless traffic nodes, wherein the reported information is a low power information. In yet another embodiment, the instructions causing a machine to issue a request associated with the low power information to one of the plurality of the wireless traffic nodes to energize the wireless traffic node with low power.

According to another exemplary embodiment of the disclosure, an intelligent distributed vision traffic marker system includes a management system and a plurality of self-powered wireless traffic nodes configured to collect data from a wireless mesh network. Each wireless traffic node is configured to function as a mesh network traffic node and in each mesh network traffic node, the mesh network traffic node is configured to exchange data between the traffic nodes. Each wireless traffic node in the vision traffic marker system is communicatively coupled to any server and client machine. The management system includes a data acquisition layer, a processing layer, and a communication layer. The acquisition layer is configured to receive data from the plurality of wireless traffic nodes and transmit the acquired data to the processing layer so that the acquired data is processed and filtered before the data is broadcasted and distributed the plurality of wireless traffic nodes which in turn exchange or share the data with any server and client machine.

According to another exemplary embodiment of the disclosure, the vision traffic marker system includes a plurality of self-powered wireless traffic nodes configured to collect data from a wireless mesh network. Each wireless traffic node is configured to function as a mesh network traffic node and in each mesh network traffic node, the mesh network traffic node is configured to exchange data between the traffic nodes. Each wireless traffic node includes a data acquisition layer, a processing layer, and a communication layer. The acquisition layer of a first wireless traffic node is configured to receive collected data from at least a second wireless traffic node and transmits the acquired data to the processing layer so that the acquired data is processed and filtered before the data is broadcasted and distributed the plurality of wireless traffic nodes which in turn exchange or share the data with any server and client machine.

BRIEF DESCRIPTION OF THE DRAWINGS

These and other features, aspects, and advantages of this disclosure will become better understood when the following detailed description of certain exemplary embodiments is read with reference to the accompanying drawings in which like characters represent like arts throughout the drawings, wherein.

DETAILED DESCRIPTION

The following description is presented to enable any person skilled in the art to make and use the described embodiments, and is provided in the context of a particular application and its requirements. Various modifications to the described embodiments will be readily apparent to those skilled in the art, and the general principles defined herein may be applied to other embodiments and applications without departing from the spirit and scope of the described embodiments. Thus, the described embodiments are not limited to the embodiments shown, but are to be accorded the widest scope consistent with the principles and features disclosed herein.

Figure 1:
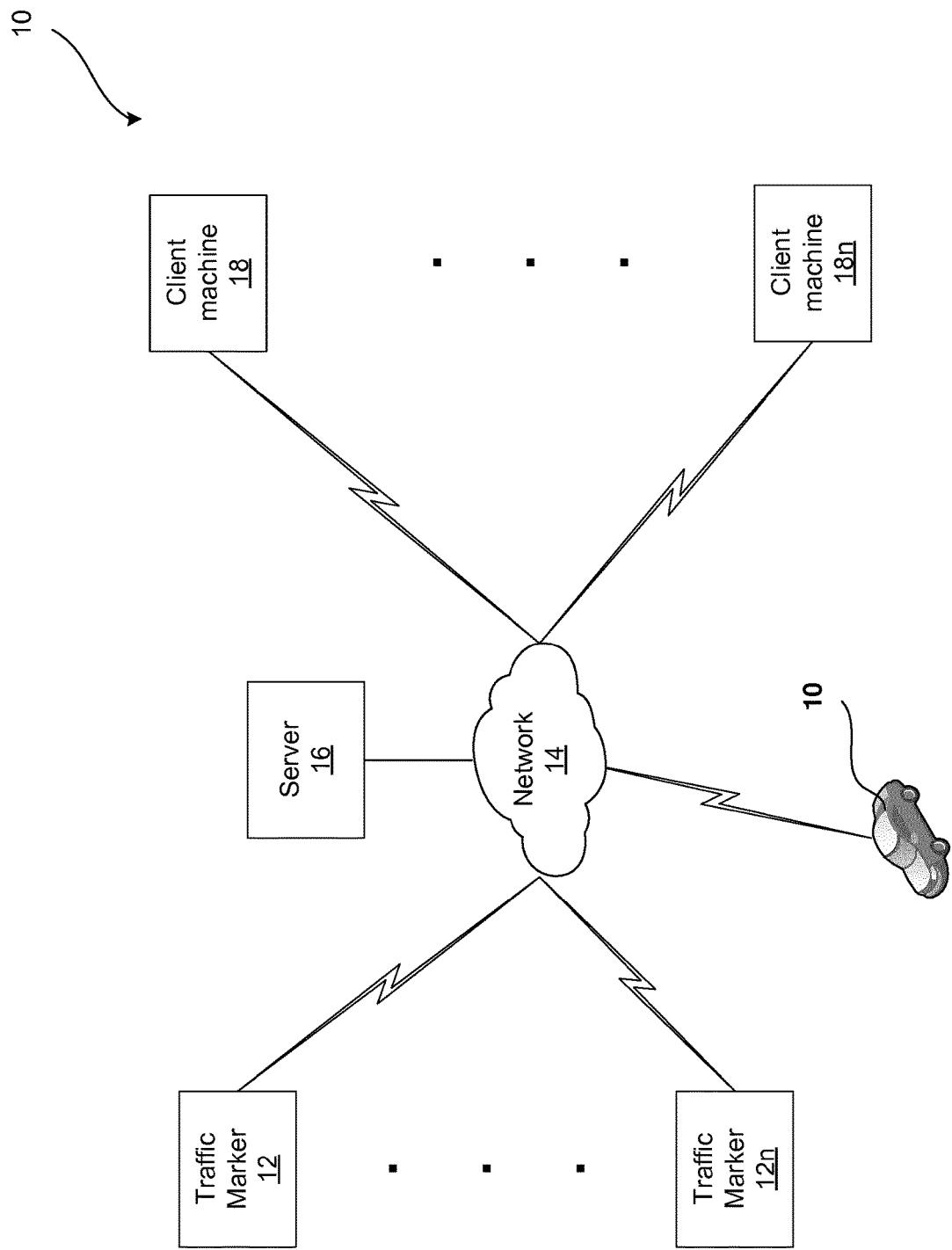
FIG. 1 is a perspective view illustrating a traffic environment network system according to an exemplary embodiment of the disclosure.

FIG. 1 illustrates a traffic environment network system 10 of an exemplary embodiment of a disclosure. The system network 10 includes a network 14 communicatively coupled to a plurality of traffic markers 12 and at least one client device 18 via communication links in a distributed computing environment. The traffic markers 12 are configured to detect an event, an environment, and a status of a target. The target includes traffic condition, weather condition, and any condition related to the environment. The traffic markers 12 are also configured to collect, analyze, distribute, and report detected information to a stakeholder. The client machines 18 may be a personal computer or desktop computer, a laptop, a cellular or smart phone, a tablet, a personal digital assistant (PDA), a gaming console, an audio device, a video device, a vehicle infotainment, a wearable device, an entertainment device such as a television, or the like. A server 16 may be optionally integrated into the network 14. In some embodiments, one or more servers may be communicatively coupled to the client devices 18 the traffic markers 12, and the network 14. The server 16 may be an application server, a certificate server, a mobile information server, an e-commerce server, a FTP server, a directory server, CMS server, a printer server, a management server, a mail server, a public/private access server, a real-time communication server, a database server, a proxy server, a streaming media server, or the like. The client machine 18 can in some embodiment be referred to as a single client machine or a single group of client machines, while the server 16 may be referred to as a single server or a single group of servers. In one embodiment a single client machine communicates with more than one server, while in another embodiment a single server communicates with more than one client machine. In yet another embodiment, a single client machine communicates with a single server. The client machines 18 can link to the traffic markers 12 through a number of ways which may be for example by voice input, typing, gesture input, biometric input, and the like.

The network 14 can comprise one or more sub-networks, and can be installed between any combination of the client machines 16, the server 16, and the traffic markers 12. In some embodiments, the network 14 can be for example a local-area network (LAN), a metropolitan area network (MAN), a wide area network (WAN), a primary network comprised of multiple sub-networks located between the client machines 18, the server 16, and the traffic markers 12, a primary public network with a private sub-network, a primary private network with a public sub-network, or a primary private network with a private sub-network. Still further embodiments include the network 14 that can be any network types such as a point to point network, a broadcast network, a telecommunication network, a data communication network, a computer network, an ATM (Asynchronous Transfer Mode) network, a SONET (Synchronous Optical Network) network, a SDH (Synchronous Digital Hierarchy) network, a wireless network, a wireline network, and the like. Depending on the application, other networks may be used so that data exchanged between the client machine and the server can be transmitted over the network. Network topology of the network 14 can differ within different embodiments which may include a. bus network topology, a star network topology, a ring network topology, a repeater-based network topology, or a tiered-star network topology. Additional embodiments may include a network of mobile telephone networks that use a protocol to communicate among mobile devices, where the protocol can be for example AMPS, TDMA, CDMA, GSM, GPRS, UMTS, LTE or any other protocol able to transmit data among mobile devices. In some embodiments, the traffic marker 12 is a cloud computing device which may be communicated with via the Internet, and which may be co-located or geographically distributed, wherein shared resources, software, and information are provided to computers and other devices on demand for example, as will be appreciated by those skilled in the art. V In another embodiment, the cloud based traffic markers 12 may be implemented as one or more servers which may be communicated with via the Internet.

The communication interfaces between the client machines 18, the traffic markers 12, the network 14, and the server 16 may be wired, wireless, or combination thereof. The wireless communication interfaces may include cellular protocol, data packet protocol, radio frequency protocol, satellite band, infrared channel, or any other protocol able to transmit data among client machines. The wired communication interfaces may include any wired line interfaces. Each traffic marker 12 may communicate with each other over the network 14. In addition, each traffic marker 12 may communicate with one or more client machines 18 over the network 14.

Figure 2:
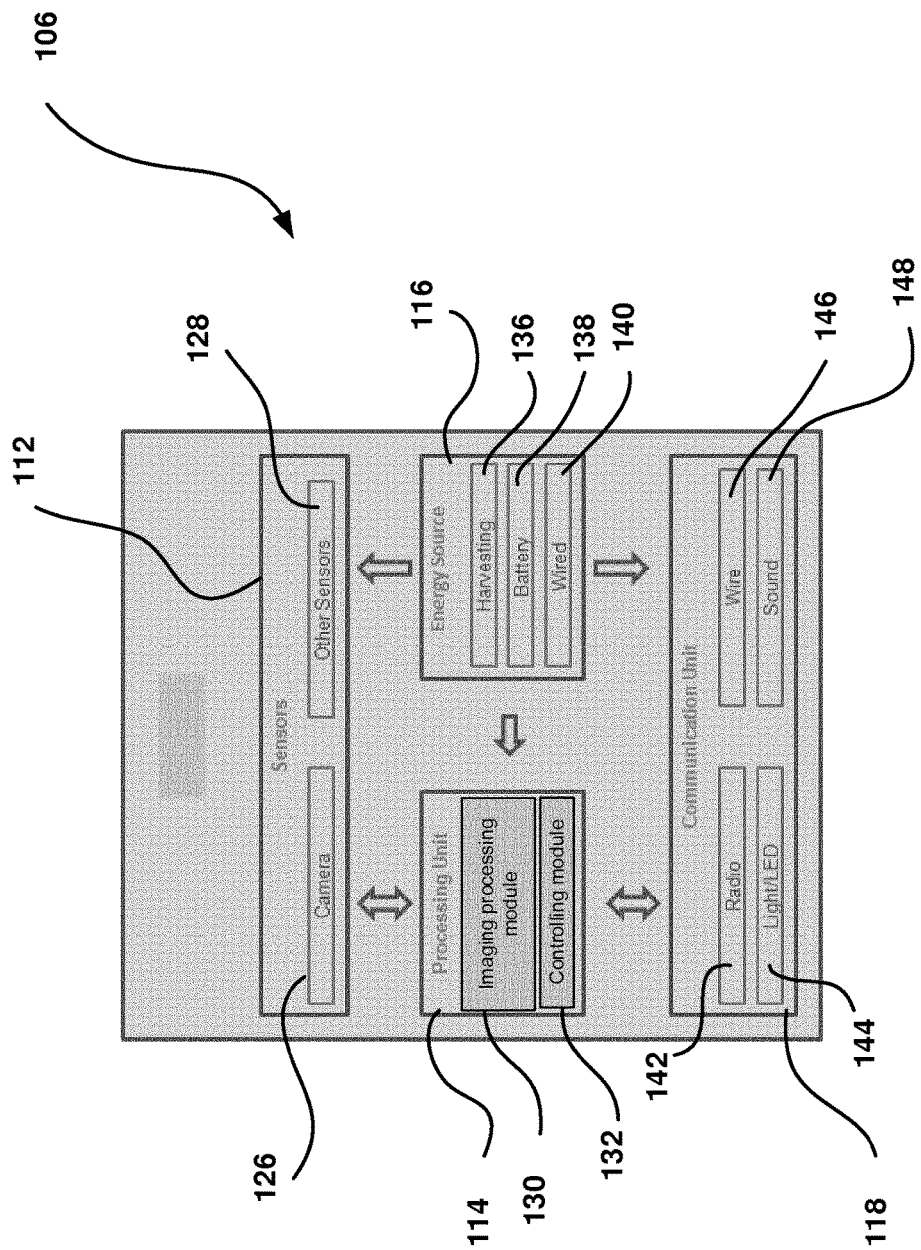
FIG. 2 is a block diagram illustrating a vision traffic marker according to a described embodiment of the disclosure.

FIG. 2 depicts a block diagram of a vision traffic marker 106 for a traffic environment network system 10 according to an exemplary embodiment of the disclosure. The vision traffic marker 106 includes a sensor assembly 112, a processing assembly 114, an energy source 116, and a communication interface assembly 118. The sensor assembly 112 includes an imaging sensor or a camera 126 and a sensor unit 128. In one embodiment, the sensor unit 128 may be a thermal sensor, a humidity sensor, an inertial sensor, a gas sensor, a motion sensor, a profile sensor, an environmental sensor, an optical sensor, acoustic sensor, a combination thereof, or the like. Although one sensor 128 is illustrated, more than one sensor may be integrated into the vision traffic marker 106 to collect information such as environmental condition or traffic condition and then transmit the collected information in a formed of output signal to other internal components including the processing assembly 114 for processing. In one embodiment, the sensing sensor or the camera 126 and the sensor 128 may be integrated into a single package assembly. In another embodiment, the camera 126 and the sensor 128 may be two separate units and are electrically coupled to other internal components. In some embodiments, the sensors 126, 128 are fabricated as a single MEMS device. Detailed description of the camera or imaging sensor 126 will be described later.

The energy source 116 configured to power up the vision traffic marker 106 includes an energy storage device 138, an energy harvesting unit 136, and a wired connection unit 140 for connection to an external power source. Although various types of energy source units 136, 138 are incorporated into the vision traffic marker 106, other types of energy source unit such as an inductive charging unit, a qi-charging unit, a resistive charging unit, a solar unit, a secondary battery, a fuel cell unit, a supercapacitor, or the like may be either integrated into the vision device or communicatively coupled to the vision traffic marker 106 to energize or power the vision traffic marker 106. The wired connection unit 140 may be connected to an external source such as an AC source or a DC source.

The processing assembly 114 includes an imaging processing unit 130 and a controlling unit 132. The imaging processing unit 130 receives information captured by the sensor assembly 112 and processes the information. Once the information is processed, the imaging processing unit 130 transmits the processed information to the controlling unit 132. In turn, the controlling unit 132 generates a command for controlling the internal components, other vision traffic marker 106, or combination thereof. The controlling unit 132 may be of any type, including but not limited to a microprocessor, a microcontroller, a digital signal processor, or any combination thereof. Depending on the desired configuration, the processor may be includes one or more integrated circuits configured as a central processing unit, microcontroller, field programmable gate array (FPGA), application specific integrated circuit (ASIC), digital signal processor (DSP), or any other suitable digital logic device. The controlling unit 132 may also include a memory, such as a solid state or magnetic data storage device, that stores programmed instructions that are executed by the controlling unit 132 for operation of the vision traffic marker 106. In one embodiment, the controlling unit 132 may be operated autonomously without any server engagement based on the predefined rules and the data which is gather using the sensor assembly 112. The controlling unit 132 may include one more levels of caching, such as a level cache memory, one or more processor cores, and registers. The example processor cores may (each) include an arithmetic logic unit (ALU), a floating point unit (FPU), a digital signal processing core (DSP Core), or any combination thereof. An example memory controller may also be used with the processor, or in some implementations the memory controller may be an internal part of the processor. The controlling unit 132 includes hardware such as DSP which process the audio data or acoustic signal, and software components such as acoustic recognition software to identify the event.

The communication interface assembly 118 allows software and data to be transferred between the computer system, other external electronic devices, and other vision traffic markers in the form of signals which may be, for example, electronic, electromagnetic, optical, or other signals capable of being received by the communication interface. The communication interface may be for example a modem, a network interface, a communication port, a PCMCIA slot and card, or the like. As illustrated in FIG. 2, the communication interface assembly 118 includes a radio unit 142, a light emitting unit 144, a wire/wireless interface 146, and an acoustic transducer 148. The radio unit 142 may be transceiver, an antenna, a receiver (TX), a transmitter (TX), or the like. The light emitting unit 144 may be for example a LED, an opto-coupler, or the like. The wire/wireless interface 146 may include cellular protocol, data packet protocol, radio frequency protocol, satellite band, infrared channel, or any other protocol able to transmit data among client machines. Also, the wire/wireless interface 146 includes any wired line link. The acoustic transducer 148 may be a microphone, a speaker, an audio input and output device, or a combination thereof. The communication assembly 118 may also include global navigation receiver to provide navigation and communication with external data networks, computing devices, client machines, other vision devices, and others. In one embodiment, the communication interface assembly 118 is communicatively coupled with other internal components thin the vision traffic marker 106 and with other devices client machines, vision traffic markers, a server, in-vehicle networks, traffic lights, street lights, or combination thereof over the network to exchange and share information of the event, activity, or status of the condition. The acoustic transducer 148 generates audio data or receive acoustic signal from an event and then transmits the signal to the controlling unit 132 for processing before the processed signal is transmitted to other external devices.

Figure 3A:
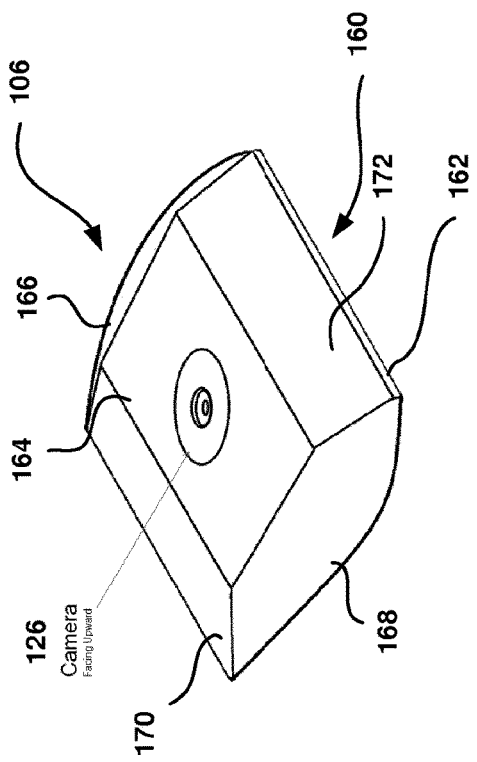
FIGS. 3A-3D are perspective views illustrating the vision traffic marker of FIG. 2 according to various embodiments of the disclosure.
Figure 3B:
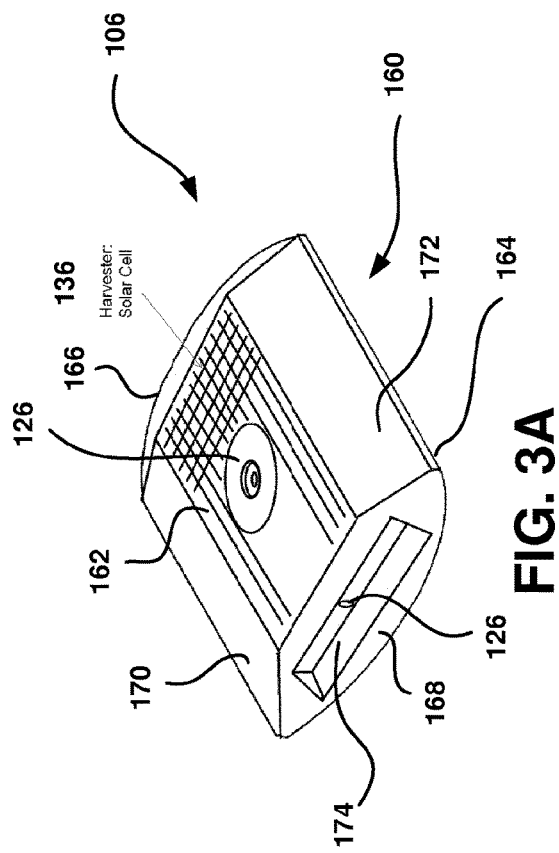

FIGS. 3A-3D illustrate various embodiments of the vision traffic marker 106 of the traffic environment network system. The vision traffic marker or traffic node 106 includes a housing 160 for encapsulating various internal components. The housing 160 includes a top portion 162, a bottom portion 164, a front portion 166, a rear portion 168, and lateral portions 170 and 172 extended from the top portion 162. In one embodiment, the lateral portions 170 and 172 may extend from other portions of the housing 160 such as the bottom portion 164 as shown in FIG. 3B. A receiving end 174, illustrated as an input and output port, is integrated to either the front portion 166 or the rear portion 168. In one embodiment, the receiving end 174 having an input/output port (I/O) for connection to a power source. In some embodiments, the I/O is a micro-USB that provides connection other devices. As depicted in FIG. 3A, an energy harvesting unit 136 is integrated into the vision traffic marker 106 for supplying energy to power the rest of the internal components. The energy harvesting unit 136 may be located on the top portion 162 of the housing 160, as illustrated. Alternatively, the energy harvesting unit 136 may be located on various portions of the housing 160. Although one harvesting unit 136 is provided in the vision traffic marker 106, more than one harvesting unit may be incorporated into the vision traffic marker, depending on the application. The harvesting unit 136 may be an inductive charging unit, a qi-charging unit, a resistive charging unit, a solar cell battery, a secondary battery, a solid state battery a fuel cell unit, or the like.

Figure 3C:
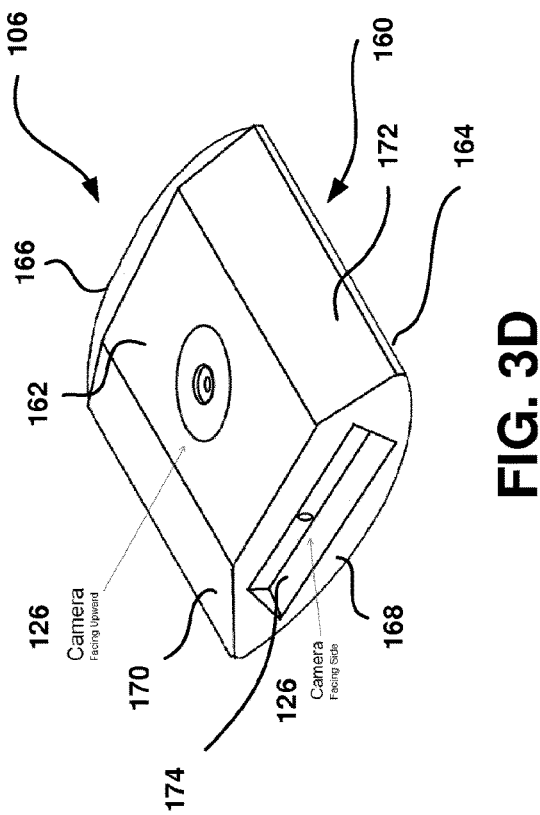
Figure 3D:
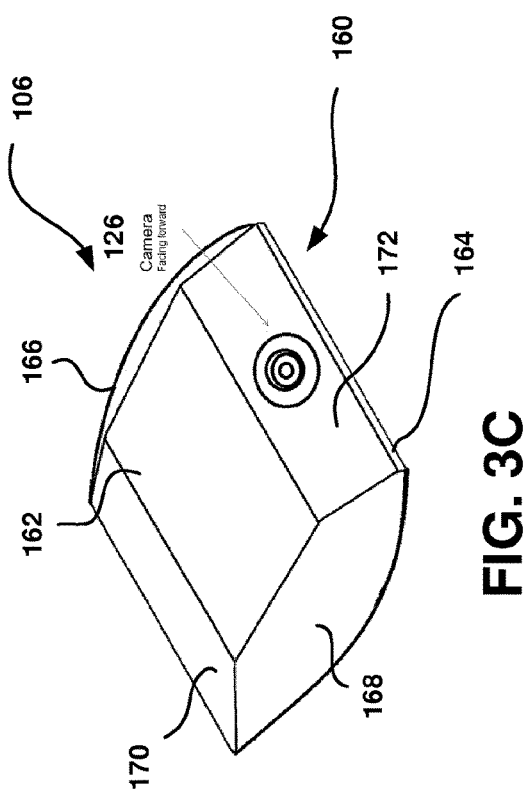

A camera or an imaging sensor 126 is configured to capture images of an event, an environment, a profile, or a condition of an object such as automotive, human, or combination thereof. As depicted in FIGS. 3A and 3D, two cameras or imaging sensors 126 are incorporated into the vision traffic marker 106, i.e. first camera is located on the top portion 162 of the housing 160 and second camera is located on the rear portion 168 of the housing 160. Alternatively, the camera 126 may be located on any portions of the housing 160 other than the described portions 162 and 168. In one embodiment, the camera 126 is located on the bottom portion 164 of the housing 160, as illustrated in FIG. 3B. In another embodiment, the camera 126 is located on one of the lateral portion 170, 172 of the housing 160, as illustrated in FIG. 3C. The second camera 126 as shown in FIGS. 3A and 3D is located on the rear portion 168 is in proximal to the receiving end 174.

Figure 4:
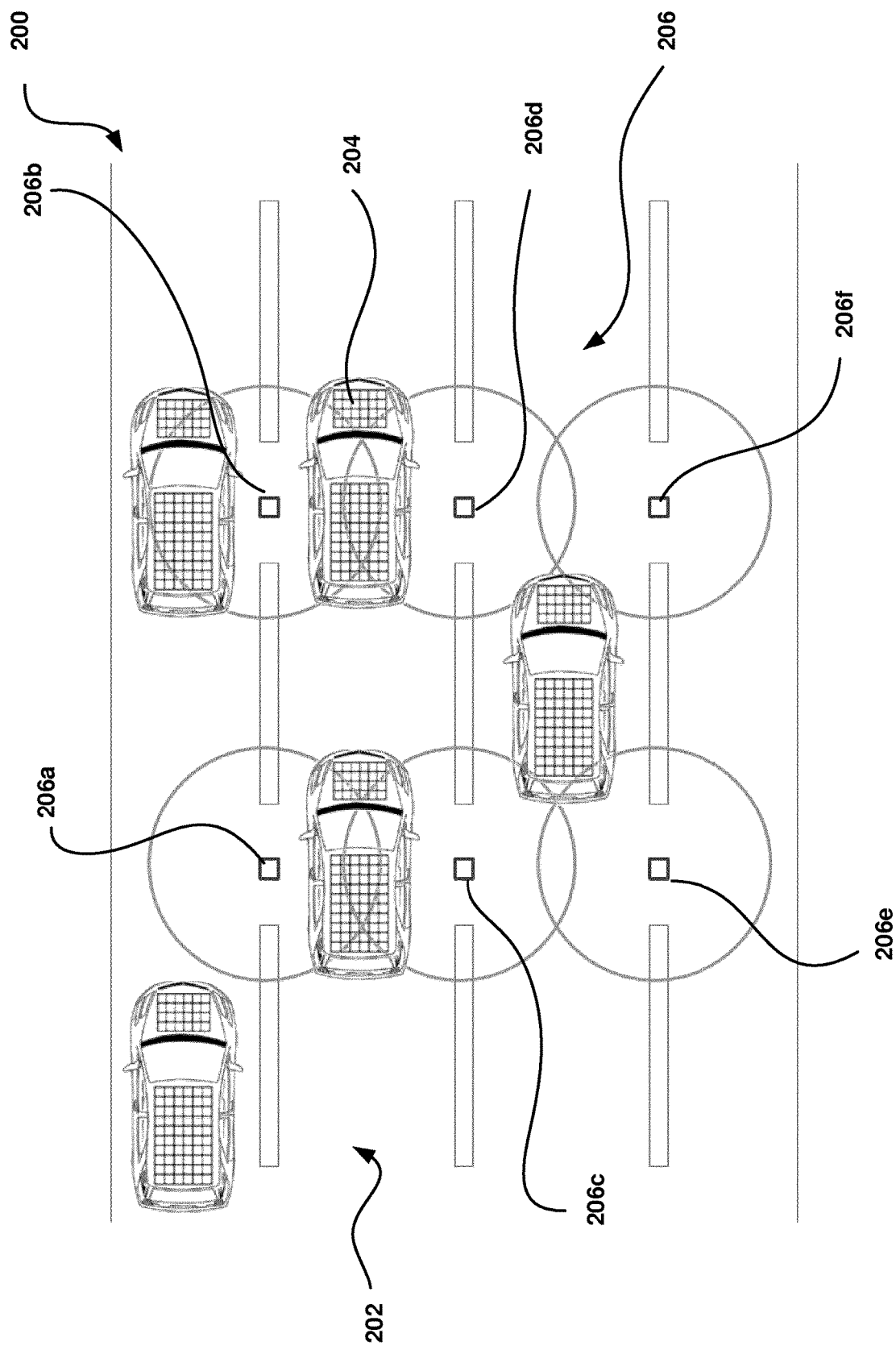
FIG. 4 is a schematic view illustrating an environment illustrating a traffic environment system comprising a network of distributed vision traffic markers according to one illustrated embodiment of the disclosure.

Now referring to FIG. 4, a traffic environment infrastructure 200 according to an exemplary embodiment of the disclosure is illustrated. The infrastructure 200 includes a road infrastructure 202, a plurality of vehicles 204, and a vision traffic node network system 206. The road infrastructure 202 may be a street, a parking lot, a bridge, a tunnel, a highway, an expressway, and the like. The vision traffic node network system 206 comprises a plurality of vision traffic markers 206a-206f, six vision devices are illustrated, configured to capture information such as an event, an environment, a profile, or a condition of an object such as vehicle, human, combination thereof, or the like, for example. The environment information may be time of day, day of week, weather, traffic condition, and the like. The vehicles 204 may be four-wheeled vehicles, motorcycles, trucks, RVs, and the like. The human information may be driver profile, passenger profile, pedestrian profile, or user profile. Depending on the applications, more or less than six vision traffic markers, also referred as traffic nodes may be incorporated as part of the vision traffic node network system 206 without altering the operation of the system or nodes. The nodes 106a-106f may be one of a traffic node, an ambient node, a repeater, a gateway, or a combination thereof. These nodes 206a-206f are arranged in network neighborhoods and configured for over the air communication with one another. In one embodiment, the nodes may be operated in at least one or more of the networks, such as a mesh network, machine-to-machine (M2M) network, car-to-infrastructure network, or combination. As illustrated, the vision traffic node network system 206 is configured to function as a wireless mesh traffic node network system. The vision traffic markers 206-206f are configured to communicate with at least one of the vision traffic markers or traffic nodes, a control system, the automotives, a server, a global navigation system, other non-vision devices, traffic lights, street lights, client machines, or combination thereof, via one more links, either wireless or wired communication. The client machine may be a smartphone, a tablet, a notebook computer, a laptop computer, a wearable device, or other electronic device. The communication includes data package protocol, cellular protocol, any radio frequency communication protocol, a combination thereof, or the like. In some embodiments, more than one vision traffic marker or traffic node may be interconnected in the same vehicle via different communication links Depending on the applications, various different vision traffic markers or traffic nodes may be deployed at any location to perform one or more tasks that operate either individually or in concert as multiple sub-group networks to provide captured information to one or more devices including control system, the automotives, a server, a global navigation system, other non-vision devices, traffic lights, street lights, client machines, or combination thereof. In one embodiment, the captured information may be traffic conditions, ambient conditions, vehicle license plate number, speed of the vehicle, color of the vehicle, type of the vehicle, vehicle model, classification of passing cars, profile of the pedestrian, number of passengers in the vehicle, the profile of the driver (such as whether the driver has a safety helmet or seatbelt on), misbehavior of the driver and/or passenger(s), or the like. In another embodiment, the captured information may include average speed of cars during a certain time. In yet another embodiment, the captured information may be information of the vision traffic marker for diagnosis. The information of the vision traffic marker includes condition and status, such as, cleanliness of lens, battery life, geo location, link status, or the like.

In one embodiment, the vision traffic node network system 106 is organized as a central network system. In another embodiment, the vision traffic node network system 106 is organized on tiers, for example a high tier sub-network system, a medium tier sub-network system, and a low tier-sub-network system, in which each of these sub-network systems is assigned to perform different and tier-specific data collection and process tasks specific for that tier. The distribution of tier-based tasks allows testing of collected information and performed analyses within that tier sub-network system. The sub-network systems are also capable of peer-to-peer communication, sub-network system-to-sub-network system communication, sub-network system-to-node of different sub-network system, or the like. In one embodiment, two or more different sub-network systems may share one or more common vision traffic marker or traffic nodes. In another embodiment two or more different sub-network systems may be operated with different vision traffic marker or traffic nodes. The tier level structure may be based on location, geographic, road infrastructure, terrain, regional, or others.

Each vision traffic marker is powered by an energy source such as a secondary battery, a solar energy source, a resistive component, a fuel cell energy source, an inductive component, or the like. In one embodiment, the vision traffic node may be integrated into a marker component. The marker component may be a road traffic marker, a road/traffic sign, an advertisement board, a street sign, a signboard marker, a location marker, a mile marker, and the like. As illustrated in FIG. 4, each vision traffic marker 206a-206f include a fisheye lens camera or a wide lens camera for capturing a field of view (FOV) into an image. The vision traffic markers are integrated into a raised pavement marker. In some embodiment, different types of camera may be incorporated into the vision traffic marker 206a-206f to capture various types of view. Although one vision traffic node network system 206 is provided in the traffic environment infrastructure 200, more than one envisioned network system may be provided in the same traffic environment infrastructure 200 to communicate the traffic condition to another envision network system.

Figure 5:
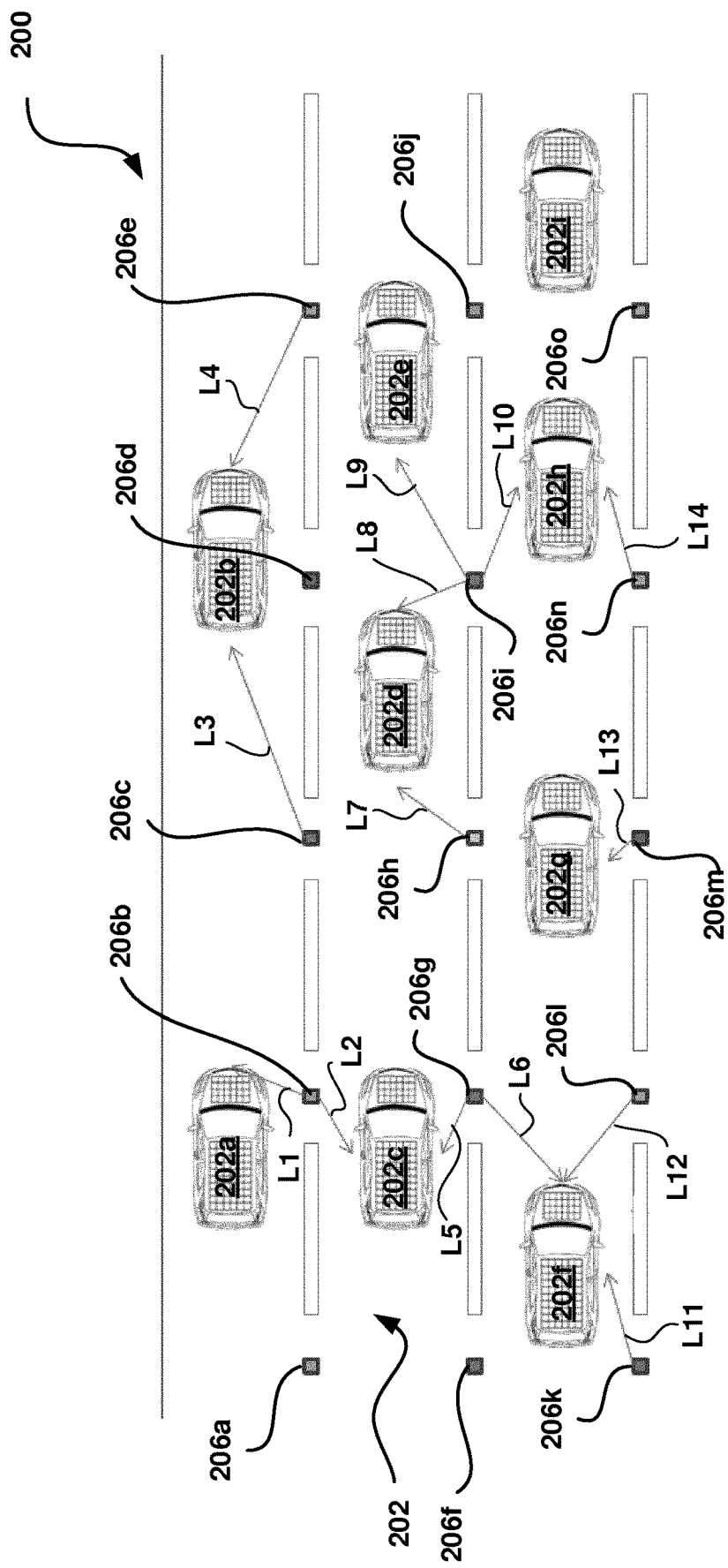
FIG. 5 is a schematic view illustrating an environment illustrating a traffic environment system comprising a network of distributed vision traffic markers according to another illustrated embodiment of the disclosure.
Figure 6:
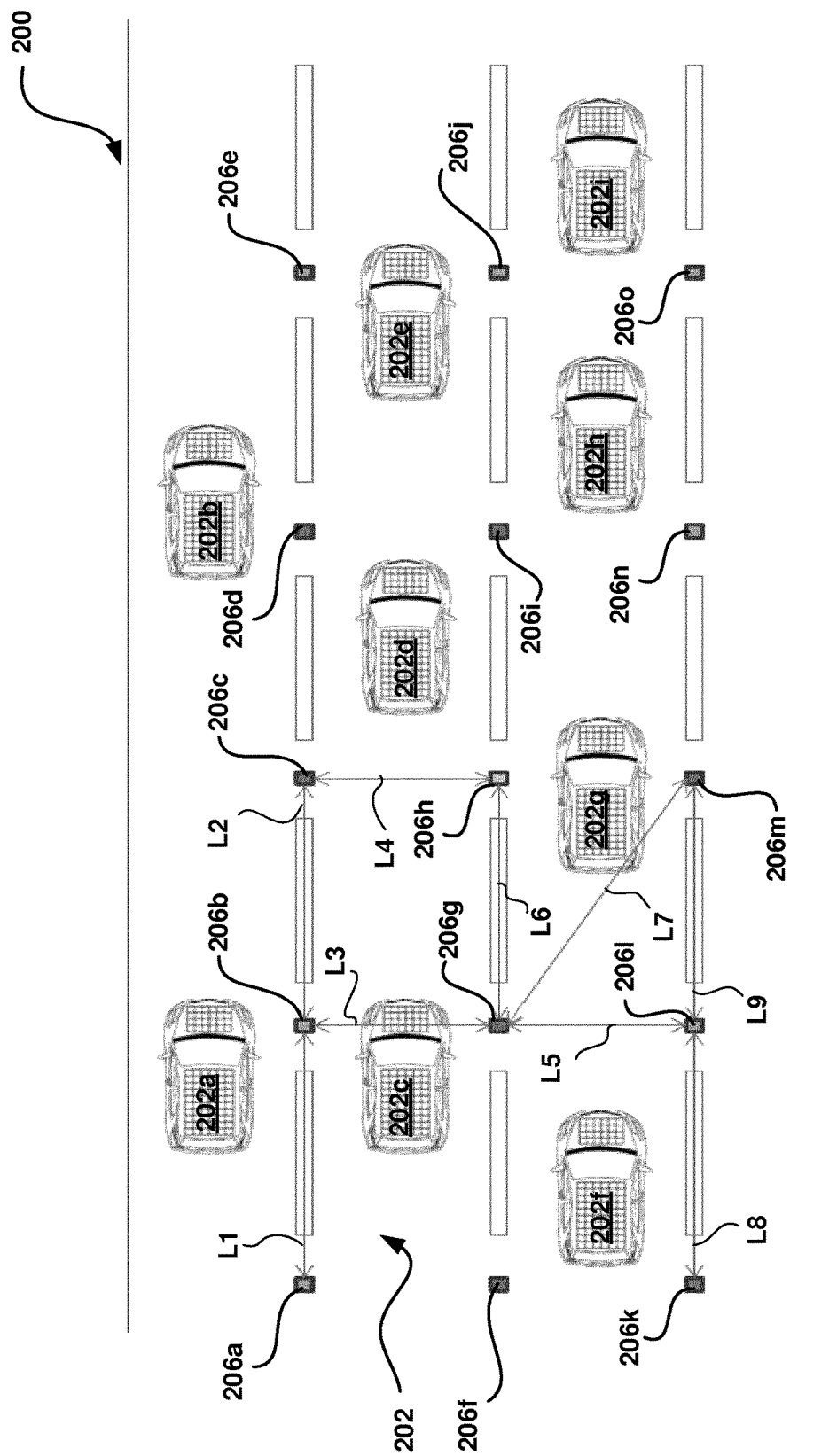
FIG. 6 is a schematic view illustrating an environment illustrating a traffic environment system comprising a network of distributed vision traffic markers according to another illustrated embodiment of the disclosure.

Now referring to FIG. 5, another traffic environment infrastructure 200 is illustrated. The traffic environment infrastructure 200 is similar to the traffic environment infrastructure 100 illustrated in FIG. 4, and like elements are referred to using like reference numerals. The vision traffic marker system 206 includes a plurality of vision traffic markers or traffic nodes 206a-206o configured to capture information such as an event, an environment, a profile, or a condition of an object such as automotive, human, combination thereof, or the like, for example. The nodes 206a-206o may be one of a traffic node, an ambient node, a repeater, a gateway, or a combination thereof. Each nodes 206a-206o may be integrated into a traffic marker, a road/traffic sign, a street sign, a signboard marker, a location marker, a mile marker, or the like. In another embodiment, more than one nodes 206a-206o may be integrated into a single marker or sign. The nodes 206a-206o are arranged in network neighborhoods and configured for over the air communication with one another. As illustrated in FIG. 5, each node 206a-206o operated either in a mesh network, machine-to-machine (M2M) network, car-to-infrastructure network, or combination is interconnected with one or more of a passing vehicle by links L1 . . . Ln. For example, node 206b is interconnected with vehicles 202a, 202c via links L1, L2. Nodes 206c and 206e, for another example, are interconnected with vehicle 202b via links L3, L4, respectively. In yet another example, node 206i is interconnected with vehicles 202d, 202e, and 202h via links L8, L9, and L10. In another example, vehicle 202f may wirelessly communicate with multiple nodes 206g, 206i, and 206k. As illustrated, each node is configured to function as a mesh network device.

As previously explained in FIG. 2, the camera or imaging sensor 126 of sensor assembly 112 one of more than one images or videos representation of an event, an environment, a profile, or a condition of an object such as automotive, human, combination thereof, or the like. The sensor assembly 112 captures or detects one or more information such as day lights, temperatures, ambient, for example, in addition to image or video. One or more of the acoustic transducer 148 and the light emitting unit 144 detect acoustic signal and light signal, respectively. The captured image, video, acoustic signal, light signal, or combination thereof is then transmitted to the processing unit 114. The processing unit 114 includes software, such as image or video processing software, which processes the captured image or video, and acoustic processing software, to identify acoustic signal, either collectively or separately processed into metadata associated with that captured information. The communication interface assembly 118 then transmits the metadata to any traffic nodes 206b-206o, the server, vehicles, client machines, and other vision traffic marker network system. For example, a driver with a hazardous driving behavior travels on a highway at 100 mile per hours without a legal licensed plate is caught by at least one of the vision device 206a-206o, the captured information is transmitted to a processing unit 114 of one of the vision device 206a-206o for processing. The processed information associated with metadata stating that the reading represents travel speed, the unlicensed vehicle plate, location of that vehicle, and time of traveling. The processed information associated with metadata may also include the predictive next location of that vehicle and arrival time to the next location in an augmented version. The communication interface assembly 118 in turn transmits the processed information associated with metadata to another vehicle, such as a law enforcer, in a nearby location. When the law enforcer receives the information, the law enforcer can chase after that vehicle to stop the driver so that accident can be avoided. In one embodiment, the processing unit 114 receives the captured image, video, acoustic signal, light signal, or combination thereof and transmits the captured image, video, acoustic signal, light signal, or combination thereof as raw data without processing it to another nodes, servers, automotives, and travelers.

In one embodiment, the captured information may be traffic conditions, ambient conditions, vehicle license plate number, speed of the vehicle, color of the vehicle, type of the vehicle, vehicle model, classification of passing cars, profile of the pedestrian, number of passengers in the vehicle, the profile of the driver (such as whether the driver has a safety helmet or seatbelt on), misbehavior of the driver and/or passenger(s), or the like. In another embodiment, the captured information may include average speed of cars during a certain time. In yet another embodiment, the captured information may be information of the vision device for diagnosis. The information of the vision device includes condition and status, such as, cleanliness of lens, battery life, geo location, link status, or the like. As previous described, the vision traffic markers are energized by an integrated energy components through chemical reaction, inductive charging, sunlight, and so far. The vision traffic markers may be energized by nearby vehicle.

FIG. 5 illustrates a traffic environment system 200 of another embodiment of the disclosure. The traffic envisioned system 206 includes a plurality of vision devices or nodes 206a-206o configured to capture information such as an event, an environment, a profile, or a condition of an object such as automotive, human, combination thereof, or the like, for example. The nodes 206a-206o may be one of a traffic node, an ambient node, a repeater, a gateway, or a combination thereof. Each vision devices 206a-206o may be integrated into a traffic marker, a road/traffic sign, a street sign, a signboard marker, a location marker, a mile marker, or the like. In another embodiment, more than one vision devices or nodes 206a-206o may be integrated into a marker or sign. The vision devices or nodes 206b, 206g, and 206i exchange the information either via wired connection or wireless connection. The nodes 206a-206o are arranged in network neighborhoods and configured for over the air communication with one another. As illustrated in FIG. 5, each of the nodes 206a-206o operated either in a mesh network, machine-to-machine (M2M) network, car-to-infrastructure network, or combination is interconnected with one or more of a node by links L1 . . . Ln. For example, node 206b exchanges and shares information with nodes 206a, 206c, and 206 via links L1, L2, L3, respectively. On the other hand, node 206g, for another example, is exchanging and sharing information with nodes 206h, 206i, and 206m via links L5, L6, L7, respectively.

The camera or sensing sensor 126 of sensor assembly 112 as shown in FIG. 2 captures one of more than one images or videos representation of an event, an environment, a profile, or a condition of an object such as automotive, human, combination thereof, or the like. The sensor assembly 112 captures or detects one or more information such as day lights, temperatures, ambient, for example, in addition to image or video. One or more of the acoustic transducer 148 and the light emitting unit 144 as shown in FIG. 2 may also detects acoustic signal and light signal. The captured image, video, acoustic signal, light signal, or combination thereof is transmitted to the processing unit 114. The processing unit 114 includes software, such as image or video processing software, which processes the captured image or video, and acoustic processing software, to identify acoustic signal, either collectively or separately processed into metadata. The communication assembly 118 then transmits the metadata to one of the vision devices 206b-206o, the server 124, automotives 202a-202i, travelers 122, and other envisioned system (not shown). In one embodiment, the processing unit 114 receives the captured image, video, acoustic signal, light signal, or combination thereof and transmits the captured image, video, acoustic signal, light signal, or combination thereof as raw data without processing it to another nodes, servers, automotives, and travelers.

In one embodiment, the captured information may be traffic conditions, ambient conditions, vehicle license plate number, speed of the vehicle, color of the vehicle, type of the vehicle, vehicle model, classification of passing cars, profile of the pedestrian, number of passengers in the vehicle, the profile of the driver (such as whether the driver has a safety helmet or seatbelt on), misbehavior of the driver and/or passenger(s), or the like. In another embodiment, the captured information may include average speed of cars during a certain time. In yet another embodiment, the captured information may be information of the vision device for diagnosis. The information of the vision traffic marker includes condition and status, such as, cleanliness of lens, battery life, geo location, link status, or the like. Unlike from the vision traffic marker having a fisheye lens camera or a wide lens camera for capturing a field of view (FOV) facing upward to the sky, as illustrated in FIG. 4. The vision traffic nodes mounted into pavement markers in FIG. 5 include a fisheye lens camera or a wide lens camera facing sideway for capturing a field of view (FOV). In some embodiments, different types of camera may be incorporated into the vision traffic marker 206a-206f to capture various types of view. Although one vision traffic node network system 206 is provided in the traffic environment infrastructure 200, more than one envisioned network system may be provided in the same traffic environment infrastructure 200 to communicate the traffic condition to another vision traffic marker network system. For example, the traffic nodes 206c, 206d, and 206 capture various views of the road conditions on the most left lane and middle lane with cameras mounted on both sides of the traffic node. The captured view may contain information other than road conditions. Once the views are captured by the cameras, the cameras transmit the views to the processing unit for analyzing and processing. The processed views are then sent to any server, other vision traffic marker network system, the network, client machines for reporting the event and status of the condition. In some embodiment, captured views may be attached together during the processing stage before it is reported to any server, other vision traffic marker network system, the network, client machines. The reported information may assist the stakeholder to take measures in controlling other devices available in the road traffic infrastructure. For example, the stakeholder, e.g. traffic control tower, may control the street lights, traffic lights, traffic signs, or bridge gates to thin out the traffic condition in case of congested traffic is reported. The traffic nodes illustrated in FIG. 5 may include two camera on each side of the node. In some embodiment, the traffic nodes may include one camera mounted on any side of the nodes. In other embodiments, a plurality of cameras may be mounted on all sides of the traffic nodes.

Figure 7:
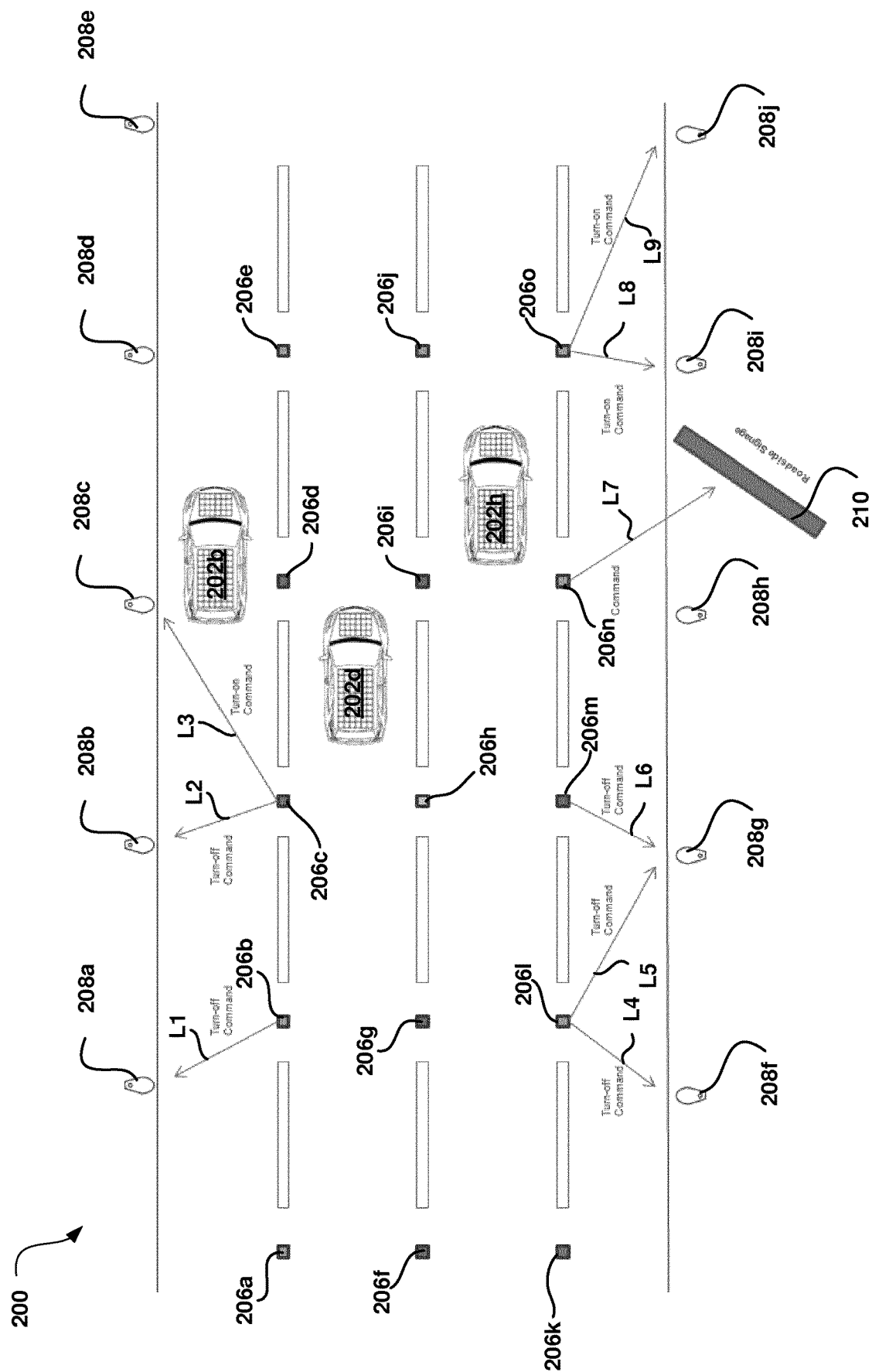
FIG. 7 is a schematic view illustrating an environment illustrating a traffic environment system comprising a network of distributed vision traffic markers according to another illustrated embodiment of the disclosure

FIG. 7 illustrates a traffic environment system 200 of another embodiment of the disclosure. The vision traffic marker network system 206 includes a plurality of vision traffic markers or traffic nodes 206a-206o configured to capture information such as an event, an environment, a profile, or a condition of an object such as automotive, human, combination thereof, or the like, for example. The nodes 206a-206o may be one of a traffic node, an ambient node, a repeater, a gateway, or a combination thereof. Each vision traffic marker 206a-206o may be integrated into a traffic marker, a road/traffic sign, a street sign, a signboard marker, a location marker, a mile marker, or the like. In another embodiment, more than one vision traffic markers or nodes 206a-206o may be integrated into a marker or sign. The vision traffic markers or nodes 206b, 206g, and 206i exchange the information either via wired connection or wireless connection. The nodes 206a-206o are arranged in network neighborhoods and configured for over the air communication with one another. One or more agents such as traffic signs or traffic lights 208a-208j with integrated nodes may wirelessly or wired communicate with one or more vision traffic markers or nodes 206a-206i. Optionally, a roadside signage 210 with integrated node may communicate with one or more vision traffic markers or nodes 206a-206i either via a wired communication or a wireless communication. In one embodiment, one or more of the agents 208a-208j may communicate with the signage 210 via at least one of the vision devices or nodes 206a-206i. In another embodiment, the agent 208a, such as traffic sign may communicate with another or more than one agent via one of the vision traffic marker or node 206a-206i.

As illustrated in FIG. 7, each of the nodes 206a-206o, agents with integrated nodes 208a-208j, and the signage with integrated node 210 operated either in a mesh network, machine-to-machine (M2M) network, car-to-infrastructure network, or combination are interconnected with one another by links L1 . . . Ln. For example, node 206b exchanges and shares information with traffic sign 208a via link L1. In another example, node 206c exchanges and shares information with both traffic signs 208b, 208c via links L2, L3, respectively. In yet another example, nodes 206i, 207m exchange and share different information with traffic sign 208g via links L5, L6, respectively. On the other hand, node 206n, for example, exchanges and shares information with signage via link L7. Although the nodes 206a-206o are capable to exchange and shares information with another node, agents, and signage as described above, the nodes 206a-206o are also capable of forwarding, routing, rerouting, or broadcasting to another node, agents, and signage without departing from the spirit and scope of disclosure. In another embodiment, the nodes 206a-206o placed at different locations in the traffic environment system are interconnected with each other to control one or more of the agents 208a-208j, 210 without or without an external central controller (not shown).

The camera or sensing sensor 126 of sensor assembly 112 as shown in FIG. 2 captures one of more than one images or videos representation of an event, an environment, a profile, or a condition of an object such as automotive, human, combination thereof, or the like. The sensor assembly 112 captures or detects one or more information such as day lights, temperatures, ambient, for example, in addition to image or video. One or more of the acoustic transducer 148 and the light emitting unit 144 as shown in FIG. 2 may also detects acoustic signal and light signal. The captured image, video, acoustic signal, light signal, or combination thereof is transmitted to the processing unit 114. The processing unit 114 includes software, such as image or video processing software, which processes the captured image or video, and acoustic processing software, to identify acoustic signal, either collectively or separately processed into metadata. The communication interface assembly 118 then transmits the metadata to one of the vision traffic markers 206b-206o, the server 124, automotives 202a-202i, client machines, and other vision traffic marker network system. In one embodiment, the processing unit 114 receives the captured image, video, acoustic signal, light signal, or combination thereof and transmits the captured image, video, acoustic signal, light signal, or combination thereof as raw data without processing it to another nodes, servers, automotives, and travelers. For example, a driver with a hazardous driving behavior travels on a highway at 100 mile per hours without a legal licensed plate is caught by at least one of the vision traffic markers 206a-206o, the captured information is transmitted to a processing unit 114 of one of the vision traffic markers 206a-206o for processing. The processed information associated with metadata stating that the reading represents travel speed, the unlicensed vehicle plate, location of that vehicle, and time of traveling. The processed information associated with metadata may also include the predictive next location of that vehicle and arrival time to the next location in an augmented version. The communication interface assembly 118 in turn transmits the processed information associated with metadata to at least one of the marker components such as traffic lights 208d, 208e in a nearby location. When the marker components 208d, 208e receive the information, the marker components 208d, 208e controlled by a controller turn the signal from green to red immediately to stop the vehicle and optionally protect pedestrian on the road.

In one embodiment, the captured information may be traffic conditions, ambient conditions, vehicle license plate number, speed of the vehicle, color of the vehicle, type of the vehicle, vehicle model, classification of passing cars, profile of the pedestrian, number of passengers in the vehicle, the profile of the driver (such as whether the driver has a safety helmet or seatbelt on), misbehavior of the driver and/or passenger(s), or the like. In another embodiment, the captured information may include average speed of cars during a certain time. In yet another embodiment, the captured information may be information of the vision device for diagnosis. The information of the vision device includes condition and status, such as, cleanliness of lens, battery life, geo location, link status, or the like.

Figure 8:
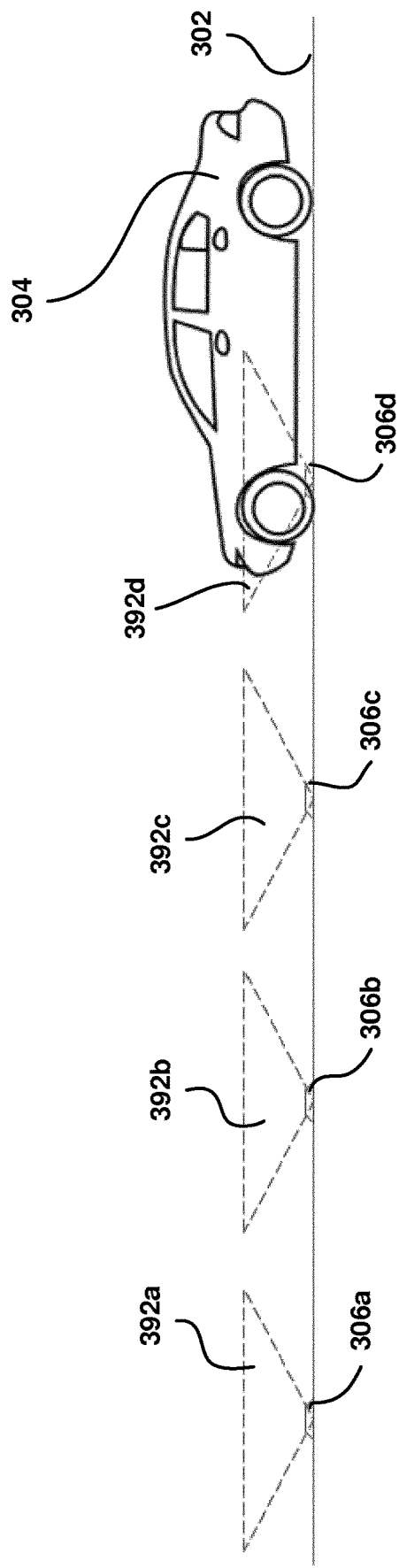
FIG. 8 is a perspective view illustrating a road infrastructure including a network of distributed vision traffic markers according to another illustrated embodiment of the disclosure.

FIG. 8 illustrates a road infrastructure 302 including a plurality of vision traffic markers or nodes 306a-306d of an exemplary embodiment of the disclosure. The vision traffic markers or nodes 306a-306d are placed at different location on a top surface of the road for capturing an event, for example. In one embodiment, the vision traffic markers or nodes 306a-306d may be integrated below the surface of the road. The vision traffic markers or nodes 306a-306d are interconnected together via wired connection or wireless connection. Each vision device or node 306a-306d as shown in FIG. 8 includes a camera or sensing sensor with a lens faces in one direction. In one embodiment, the lens of each node 306-306d may face either at an upward direction which is position at a 90 degree perpendicular to the plane of the surface, at an angle offset to the plane of the surface, or combination thereof. Each vision traffic marker or node 306a-306d are configured to pan tilt, and zoom to provide a view 392a-392d of information such as an event, an environment, a profile, or a condition of an object such as automotive, human, combination thereof, or the like, for example. The lens may be, for example, a fisheye lens or a wide lens. When a vehicle 304 on the road drives or passes through the node 306d, the information of the vehicle such as speed, bottom profile of the vehicle, are captured or detected. The neighboring nodes 306a-106c, may predict the travel time of the vehicle reaches the destination, region, or the next nodes based on the speed of the vehicle in a forward direction.

Figure 9:
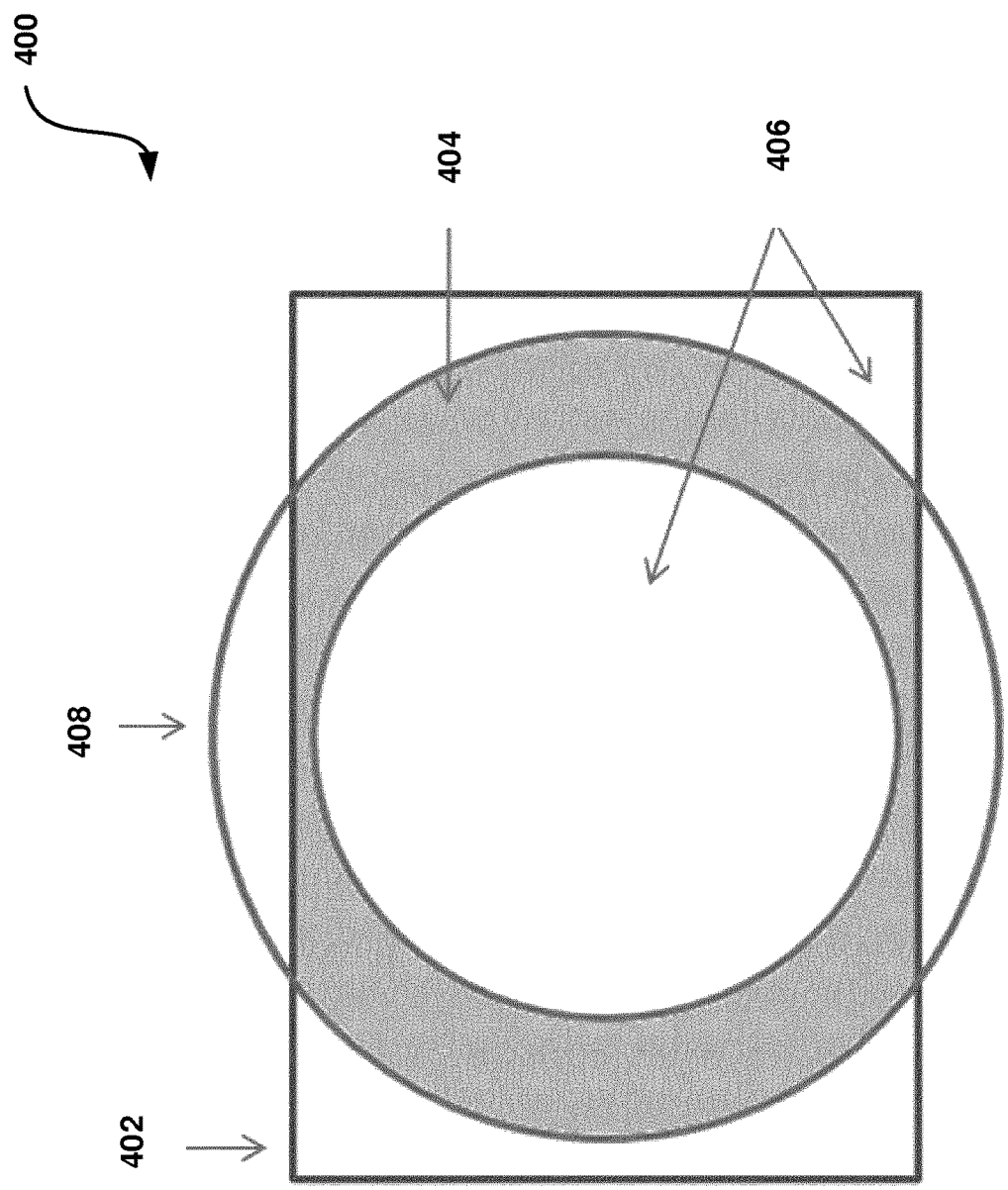
FIG. 9 is a top view illustrating an imaging array captured by an image sensor of a vision device according to an exemplary embodiment of the disclosure.

FIG. 9 depicts top view of an image sensor 400 of a vision traffic marker according to an exemplary embodiment of the disclosure. The image sensor 400 comprises a sensing die 402 and an electronic circuit (not shown) coupled to the sensing die 402. The sensing die 402 is made of silicon material. In another embodiment, the sensing die 402 may be made from other material without departing from the spirit and scope of the disclosure. The electronic circuit may be located either below the sensing die directly or indirectly, next to the sensing die, or proximal to the sensing die. An image is formed at location "formed image" 408 of the image sensor. Information to the traffic and environmental condition appears at location "active pixel area" 404 and non-traffic and environmental related information appears at location "deactivated pixel area" 306. Since the "active pixel area" 404 is smaller than the overall combined area of "deactivated pixel area" 306, the time for processing data relevant the traffic and environmental condition is significantly faster. Also, power consumption to processing the traffic and environmental related data is significantly reduced.

Figure 10:
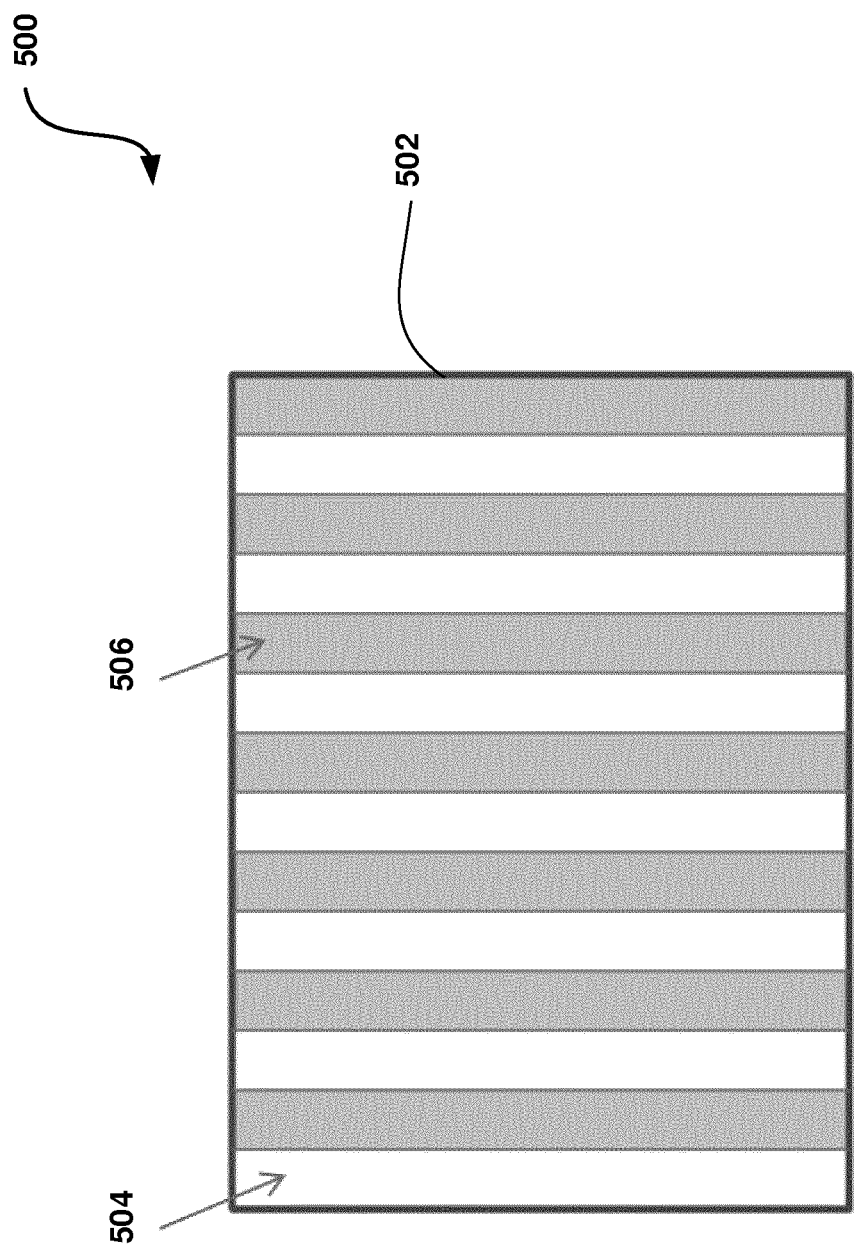
FIG. 10 is a top view illustrating an imaging array according to another embodiment of the disclosure.

FIG. 10 illustrates a top view of an image sensor 500 of a vision traffic marker according to another embodiment of the disclosure. Unlike from the image sensor 400 as shown in FIG. 9, the image sensor 500 comprises a plurality of vertical pixel having active areas 504 and deactivate areas 506. Circuitry such as an electronic circuit, readout circuit, harvesting circuit, and the like may be located on the deactivate areas. In one embodiment, the circuit may be located directly or indirectly below the deactivate areas 506. In another embodiment, the circuit may be located next to the deactivate areas 506. In yet another embodiment, the circuit may be located in proximal to the deactivate areas 506. Since the "active pixel area" 504 is reduced compare to the overall area of the chip 502, the time for processing data relevant the traffic and environmental condition is significantly faster. Also, power consumption to processing the traffic and environmental related data is significantly reduced.

Figure 11:
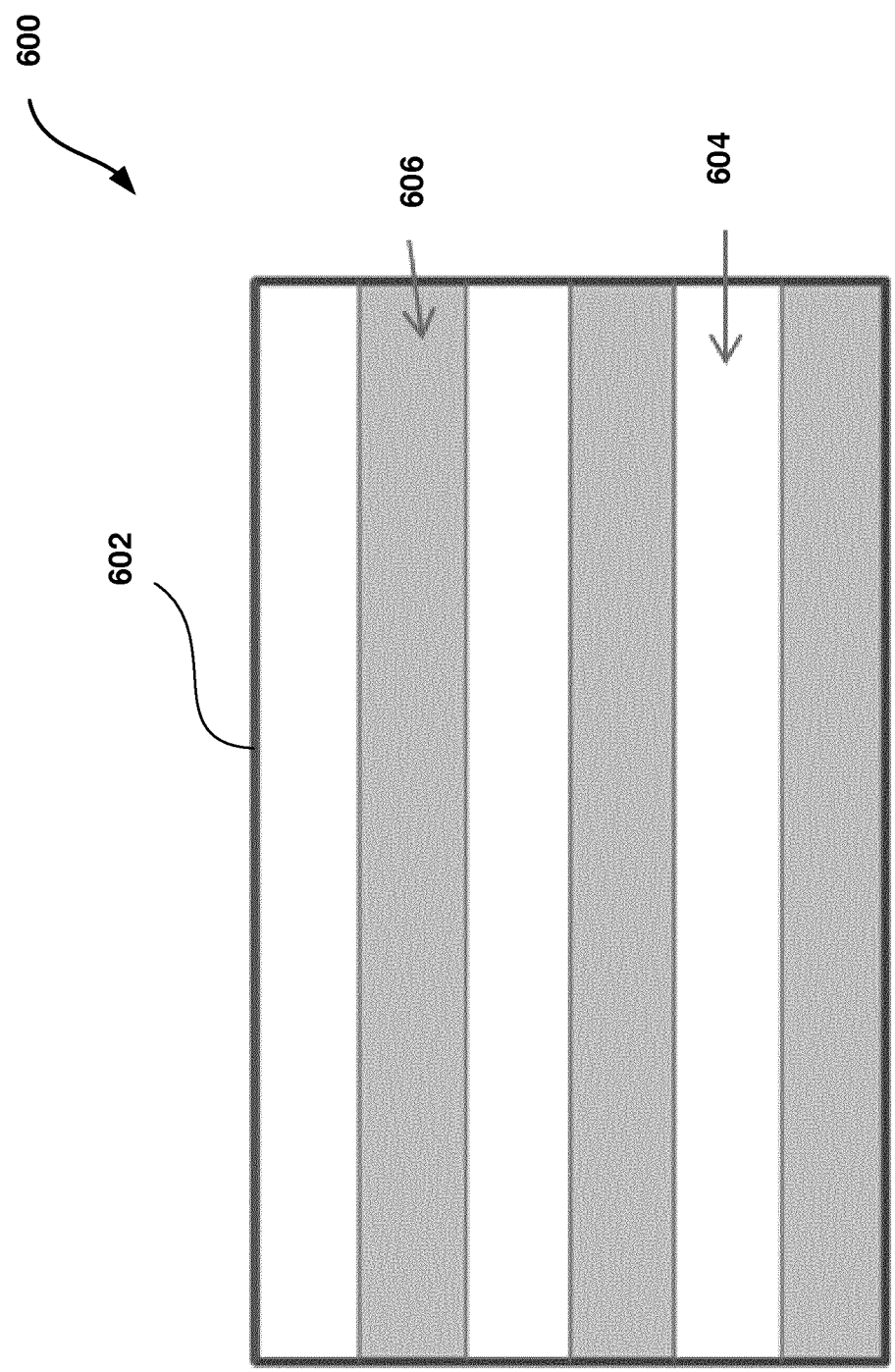
FIG. 11 is a top view illustrating an imaging array according to yet another embodiment of the disclosure.

FIG. 11 illustrates a top view of an image sensor 600 of a vision traffic marker according to another embodiment of the disclosure. The image sensor 600 is similar to the image sensor 500 of FIG. 10, except the image sensor 600 comprises a plurality of horizontal pixel having active areas 604 and deactivate areas 606. Circuitry such as an electronic circuit, readout circuit, harvesting circuit, and the like may be located on the deactivate areas. In one embodiment, the circuit may be located directly or indirectly below the deactivate areas 606. In another embodiment, the circuit may be located next to the deactivate areas 606. In yet another embodiment, the circuit may be located in proximal to the deactivate areas 606. Other than the above described arrangements or forms of image pixel arrays, the pixel array may be in the form of for example serpentine, square, oval, or other geometry. Since the "active pixel area" 604 is reduced compare to the overall area of the chip 602, the time for processing data relevant the traffic and environmental condition is significantly faster. Also, power consumption to processing the traffic and environmental related data is significantly reduced.

Figure 12:
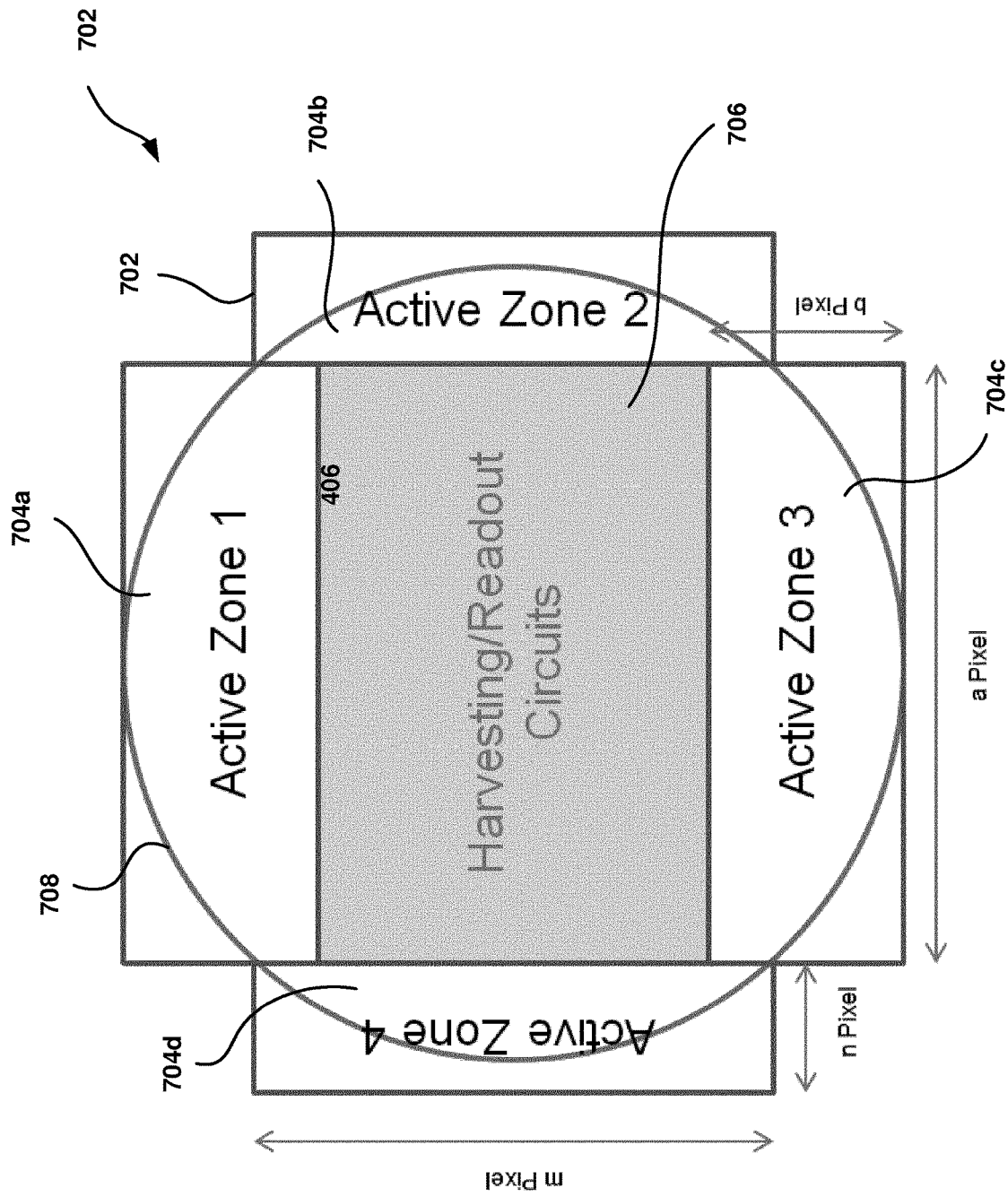
FIG. 12 is a top view illustrating an imaging array according to yet another embodiment of the disclosure.

FIG. 12 illustrates a top view of an image sensor 700 of a vision traffic marker according to another embodiment of the disclosure. The image sensor 700 is similar to the image sensor 600 of FIG. 11, except the image sensor 700 comprises multiple separate arrays 704a-704d. The image sensor 700 comprises a sensing die 702 and an electronic circuit (not shown) coupled to the sensing die 302. The sensing die 702 made of for example, a silicon material. In another embodiment, the sensing die 702 may be made from other material without departing from the spirit and scope of the disclosure. The electronic circuit may be located either below the sensing die directly or indirectly, next to the sensing die, or proximal to the sensing die. An image is formed at location 708 of the image sensor, defines as "formed image". Information of an event, an environment, a profile, or a condition of an object such as automotive, human, combination thereof, and the like appears at various locations 704a-704d, define as "active zone". Location 706 defines as "deactivated pixel area" in which circuitry such as an electronic circuit, an energy harvesting circuit, readout circuit, and the like is located. Active zones 704b, 704d include m pixel and n pixel whereas active zones 704a, 704c include a pixel and b pixel.

Figure 13:
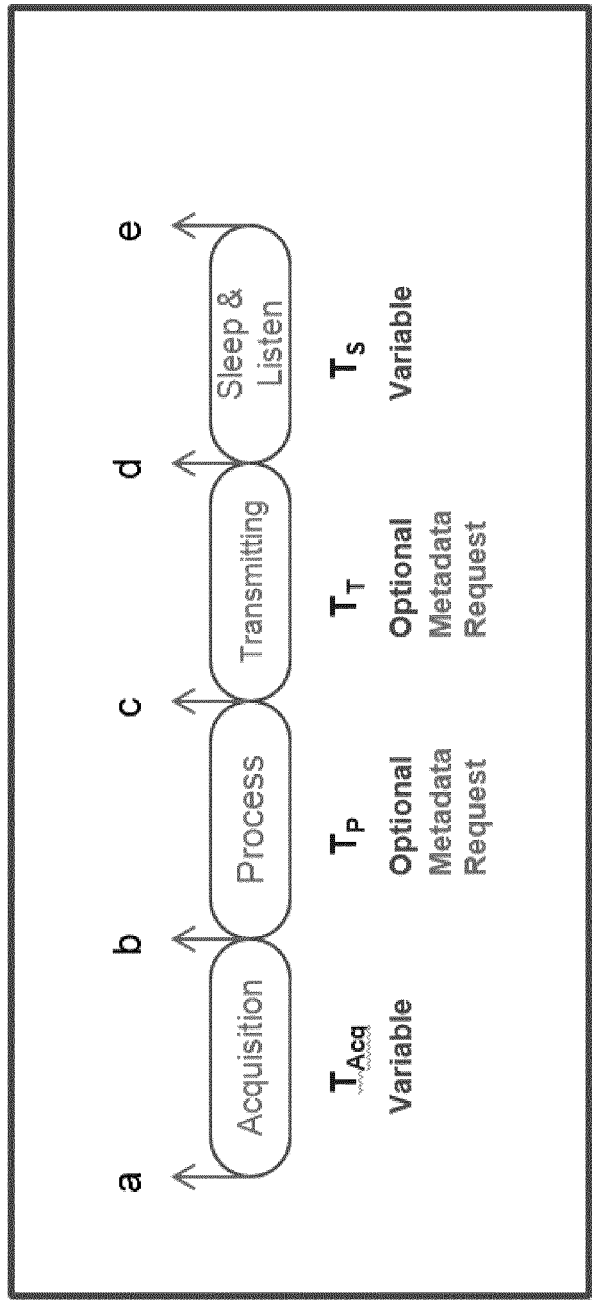
FIG. 13 is a perspective view illustrating a node operation cycle according to an embodiment of the disclosure.

FIG. 13 illustrates a node operation cycle according to an exemplary embodiment of the disclosure. At an acquisition phase, raw data is collected or acquired by at least one of the nodes 106 for $T_{acq}$ seconds through one or more sensors 126, 128. The data may be in the form of image, video, acoustic, thermal, light, and the like which represent at least one of an event, an environment, a profile, or a condition of an object such as automotive, human, combination thereof, and the like. $T_{acq}$ is a variable and changes based on the collected data between a range of about zero to maximum times required to capture the data. At a processing phase, the data is then transmitted to the processing unit 114 that executes sequences of computer-executable instructions using software stored in a machine-readable medium, such as image processing software, video processing software, acoustic processing software, and the like into metadata associated with that captured or collected data for $T_p$, defines as a processing duration. The instructions may be based on one or more requests or commands issued by another node, sub-network system, a control system, and the like. The computer-executable instructions include one or more of the processing, analyzing, comparing, summing, storing, executing, compiling, translating, transforming, distributing, interpreting, forming argument version of information associated with the captured data, and the like. At a transmitting phase, the metadata is then sent or forwarded to at least one of the vision devices or nodes, a sub-network system, a control system, the automotives, a server, a global navigation system, a marker component, other non-vision devices, traffic lights, street lights, electronic devices, and the like via the communication assembly 118 for $T_t$, defines as transmitting duration. $T_t$ can adapt based on Metadata and request. The node enters into sleep and listen mode after the transmitting phase is completed for several benefits to including preserve power or energy consumption, reduce data bandwidth, operating costs, and others. The node continues to stay in the sleep and listen mode to decrease and preserve power energy consumption until a next command from another node or the central unit is transmitted to the node to wake up the node from the sleep and listen mode. Once the node is wake up, it returns to the acquisition phase of the node operation cycle. In one embodiment, the node may be woke up by any external interruption such as a message from the automotives, a server, a global navigation system, a marker component, other non-vision devices, traffic lights, street lights, electronic devices, and the like. In another embodiment, the node may be work up by an internal interruption such as a message from the node itself for diagnosis.

Figure 14:
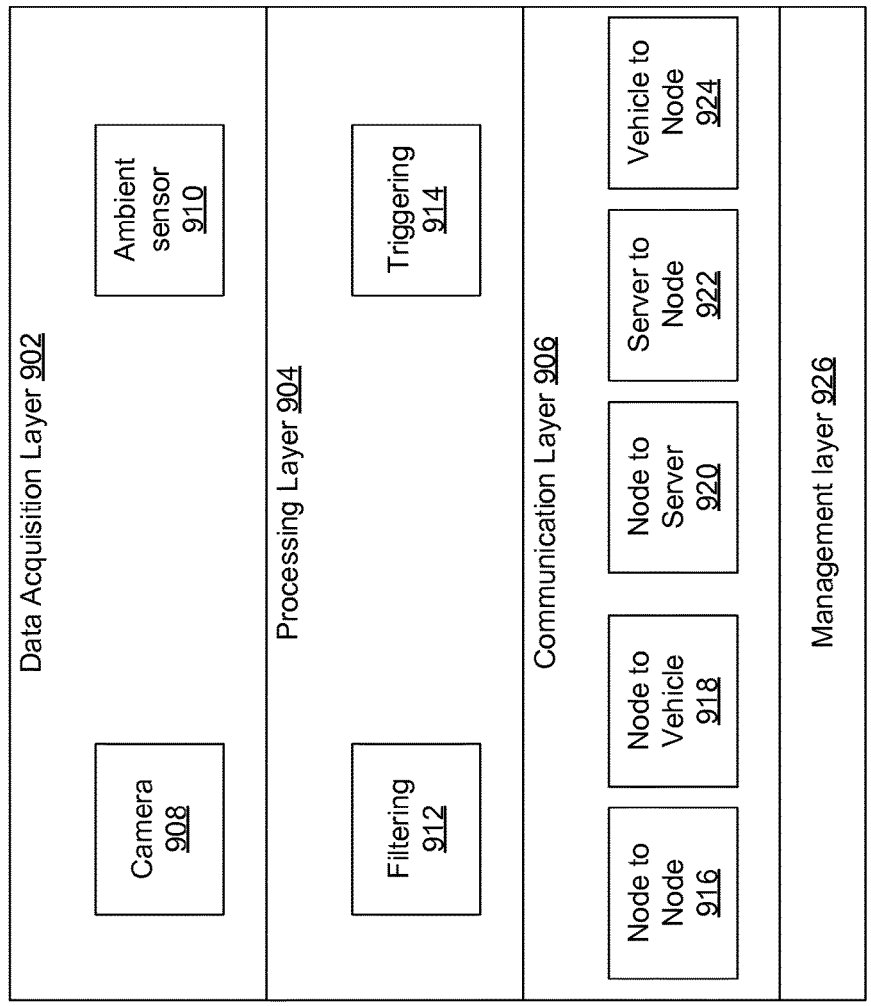
FIG. 14 is a schematic view of a management module according to an exemplary embodiment of the disclosure.

FIG. 14 illustrates a management device 900 according to an exemplary embodiment of the disclosure. The management device 900 may be integrated into the vision traffic node. In some embodiment, the management device 900 as a single device may be communicatively coupled to a plurality of vision traffic node, client machines, server, and network. The management device 900 includes a data acquisition layer 902, a processing layer 904, a communication layer 906, and a management layer 926. A camera or imaging sensor 908 and at least one sensor, an ambient sensor 910 is illustrated, are provided in the data acquisition layer 901. In some embodiments, any type of sensors may be used, depending on the applications. The processing layer 904 includes a filtering module 914 and a triggering module 914. The communication layer 906 is configured to allow software and data to be transferred between node to node 916, node to vehicle 918, node to server 920, server to node 922, and vehicle to node 924. In some embodiments, data can be shared and transferred between more than two devices, such as node-node-server, vehicle-node-server, vehicle-vehicle-node, vehicle-vehicle-server, server-server-node, node-node-traffic device, and any combination thereof. The traffic device may be traffic light, traffic signal, street light, roadside signage, and the like. As an example to FIG. 5, the acquisition layer 902 receives data from a number of traffic nodes and transmits the acquired data to the processing layer 904. The processing layer 904 then processes and filter the acquired data before the modified data is transmitted to the communication layer 906. Upon the receipt of the modified data, the management layer 926 coordinates with one or more nodes so that the modified data is distributed as needed. The management layer 926 is also configured to manage and control other layers 902, 904, and 906 with device 900. To enhance the efficiency and performance of the vision traffic marker network system, the management layer 926 may assign each node with a role to perform a function. For example, the node 206k in FIG. 7 is configured to function as a gateway node. The node 206n is assigned to operate as a data relay node while the node 206o is assigned to operate as a data collection node. Depending on the application, the management layer 926 may require information related to an event, an activity, or status of a target as an inputs from any traffic nodes, client machines, server, and network. The management layer 926 reports the information to a stakeholder for maintenance. The information in this case may be the diagnosis of any traffic nodes and the stakeholder may be a technician. If a node reports low power information to the management layers 926, the management layers 926 may locate for other nearby nodes and issue a request to that nodes to energize the node with low power using resonant charging technique.

Referring back to FIG. 7, when nodes operate in a wireless mesh network, each node exchanges data wireless with adjacent nodes. The exchanged data can be generated on any node and exchanged data can be received by any node. As an example, the node 206n is configured to function as a data relay node to forward data received from node 206l to node 206o, also referred as a data collector node. In some embodiment, the node may be configured as a remote gateway node to provide communication between the nodes and other client machines, server, traffic devices in this mesh network. In another embodiment, the node may be configured to perform more than one role. To enhance the efficiency and performance of the vision traffic marker network system, the management layer 926 may assign each node with a role to perform a function. If the node 206l is assigned to perform as a power reserve role, during a low traffic condition, the node 206l does not require to observe or collect any information related to an event, condition, activity, or status, the management layer 926 sets the node 206l to power reserve mode after the processing layer 904 reported the condition to the management layer 926. As a result, only a handful of nodes are triggered to collect data in case the traffic condition changes. To reserve power consumption, the management device 900 adopts a sampling rate or selects reference nodes to monitor the environment as the condition changes. The management device may also learn from the data collected over the time and configured various node to perform the respective node adaptive to the condition. In some embodiment, the management device may enable different mode dependent on the condition. As an example, when the node reported rainy weather, the node is enabled to rainy mode and the vision traffic marker system automatically corrects the collected data based on expected errors during a rainy condition.

The vision traffic marker system, in some embodiment, may provide predictive information to at least one of the client machines or autonomous driving cars to avoid any unexpected traffic condition, e.g. traffic congestion, road construction, accident, and so forth.

Embodiments within the scope of the disclosure may also include non-transitory computer-readable storage media or machine-readable medium for carrying or having computer-executable instructions or data structures stored thereon. Such non-transitory computer-readable storage media or machine-readable medium may be any available media that can be accessed by a general purpose or special purpose computer. By way of example, and not limitation, such non-transitory computer-readable storage media or machine-readable medium can comprise RAM, ROM, EEPROM, CD-ROM or other optical disk storage, magnetic disk storage or other magnetic storage devices, or any other medium which can be used to carry or store desired program code means in the form of computer-executable instructions or data structures. Combinations of the above should also be included within the scope of the non-transitory computer-readable storage media or machine-readable medium.

Embodiments may also be practiced in distributed computing environments where tasks are performed by local and remote processing devices that are linked (either by hardwired links, wireless links, or by a combination thereof) through a communications network.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

While the patent has been described with reference to various embodiments, it will be understood that these embodiments are illustrative and that the scope of the disclosure is not limited to them. Many variations, modifications, additions, and improvements are possible. More generally, embodiments in accordance with the patent have been described in the context or particular embodiments. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A management device for an intelligent distributed vision traffic marker system comprising:
   a camera integrated within a first roadway marker, the camera being configured to generate image data of an environment of the first roadway marker;
   at least one ambient sensor integrated within the first roadway marker, the at least one ambient sensor being configured to generate sensor data corresponding to a parameter of the environment of the first roadway marker;
   a data acquisition layer integrated within the first roadway marker and being configured to receive image data and sensor data from a plurality of roadway markers operated in a wireless mesh network, each roadway marker is different than the other roadway markers in the plurality of roadway markers and different than the first roadway marker, the data acquisition layer also being configured to receive image data from the camera in the first roadway marker and receive sensor data from the at least one ambient sensor in the first roadway marker;
   a processing layer integrated within the first roadway marker and configured to filter the image data and the sensor data received from the plurality of roadway markers and received from the camera and the at least one ambient sensor in the first roadway marker; and
   a management layer integrated within the first roadway marker, the management layer being configured to assign each roadway marker in the plurality of roadway markers with at least one function role.

2. The management device of claim 1 wherein the function role is a gateway node, a data relay node, a data collection node, and a power reserve role.

3. The management device of claim 1 further comprising:
   a communication layer integrated within the first roadway marker and configured to transfer software and data between the first roadway marker and the roadway markers in the plurality of roadway markers.

4. The management device of claim 3 further comprising:
   a client machine communicatively coupled to at least one of the roadway markers in the plurality of roadway markers or to the communication layer in the first roadway marker.

5. The management device of claim 3 wherein the management layer is configured to:
   control one of the data acquisition layer, the processing layer, and the communication layer.

6. The management device of claim 5 wherein the management layer is configured to:
   send through the communication layer information processed from the data received from one of the roadway markers in the plurality of the roadway markers, wherein the information sent indicates the one roadway marker in the plurality of roadway markers has a low power condition.

7. The management device of claim 6 wherein the management layer is configured to:
   send a request to another one of the roadway markers in the plurality of roadway markers to energize the one roadway marker having the low power condition using a resonant charging technique.

8. A device comprising:
   a non-transitory computer-readable medium configured for installation in a first roadway marker and to store computer-executable instructions that when executed by a processor in the first roadway marker cause the processor to filter acquired data received from a plurality of roadway markers and to
assign each roadway marker in the plurality of roadway markers with at least one function role.

9. The device of claim 8 wherein the function role is a gateway node, a data relay node, a data collection node, and a power reserve role.

10. The device of claim 8 wherein the instructions stored on the non-transitory computer-readable medium when executed by the processor in the first roadway marker cause the processor to transfer software and data between the roadway markers in the plurality of roadway markers and the first roadway marker.

11. The device of claim 8 wherein the instructions stored on the non-transitory computer-readable medium when executed by the processor in the first roadway marker cause the processor to send information filtered from the data received from one of the roadway markers in the plurality of roadway markers that indicates the one roadway marker has a low power condition.

12. The device of claim 8 wherein the instructions stored on the non-transitory computer-readable medium when executed by the processor in the first roadway marker cause the processor to send a request to another one of the roadway markers in the plurality of roadway markers to energize the one roadway marker having the lower power condition using a resonant charging technique.

* * * * *

UNITED STATES PATENT AND TRADEMARK OFFICE
CERTIFICATE OF CORRECTION

PATENT NO. : 10,803,737 B2
APPLICATION NO. : 16/063645
DATED : October 13, 2020
INVENTOR(S) : Pouya Farajpour et al.

Page 1 of 1

It is certified that error appears in the above-identified patent and that said Letters Patent is hereby corrected as shown below:

In the Claims

In Claim 8, at Column 19, Line 1: "to filter acquired data received" should read --to filter data received--.

Signed and Sealed this
Nineteenth Day of January, 2021

Andrei Iancu
*Director of the United States Patent and Trademark Office*